US006980529B1

(12) United States Patent
Arsenault

(10) Patent No.: US 6,980,529 B1
(45) Date of Patent: Dec. 27, 2005

(54) METHOD AND APPARATUS FOR DETERMINING THE CONFIGURATION OF CONNECTIONS ASSOCIATED WITH A SATELLITE RECEIVER/DECODER

(75) Inventor: Robert G. Arsenault, Redondo Beach, CA (US)

(73) Assignee: The Directv Group, Inc., El Segundo, CA (US)

( * ) Notice: Subject to any disclaimer, the term of this patent is extended or adjusted under 35 U.S.C. 154(b) by 890 days.

(21) Appl. No.: 09/712,625

(22) Filed: Nov. 14, 2000

Related U.S. Application Data

(63) Continuation of application No. 09/130,492, filed on Aug. 7, 1998, now Pat. No. 6,430,165.

(51) Int. Cl.[7] .......................... H04B 7/204; H04H 1/00; H04N 7/20
(52) U.S. Cl. ..................... 370/316; 370/325; 455/3.02; 725/69
(58) Field of Search ............................... 370/315, 316, 370/329, 334, 349, 323, 325; 455/3.01, 3.02, 455/3.04; 725/63, 64, 68, 69, 72

(56) References Cited

U.S. PATENT DOCUMENTS

| | | | |
|---|---|---|---|
| 4,694,490 A | | 9/1987 | Harvey et al. |
| 5,319,707 A | | 6/1994 | Wasilewski et al. |
| 5,345,594 A | | 9/1994 | Tsuda |
| 5,583,562 A | | 12/1996 | Birch et al. |
| 5,603,077 A | | 2/1997 | Muckle et al. |
| 5,625,693 A | * | 4/1997 | Rohatgi et al. ............. 713/187 |
| 5,631,903 A | | 5/1997 | Dianda et al. |
| 5,649,318 A | * | 7/1997 | Lusignan ..................... 725/70 |
| 5,666,293 A | | 9/1997 | Metz et al. |
| 5,734,589 A | | 3/1998 | Kostreski et al. |
| 5,742,680 A | * | 4/1998 | Wilson ......................... 725/68 |
| 5,767,913 A | | 6/1998 | Kassatly |
| 5,768,539 A | | 6/1998 | Metz et al. |
| 5,864,747 A | * | 1/1999 | Clark et al. ................... 725/67 |
| 5,886,995 A | | 3/1999 | Arsenault et al. |
| 5,892,508 A | | 4/1999 | Howe et al. |
| 5,892,536 A | | 4/1999 | Logan et al. |
| 5,894,320 A | | 4/1999 | Vancelette |
| 5,923,362 A | | 7/1999 | Klosterman |
| 5,940,737 A | * | 8/1999 | Eastman ....................... 725/68 |
| 5,951,639 A | | 9/1999 | MacInnis |
| 6,009,116 A | | 12/1999 | Bednarek et al. |
| 6,009,307 A | | 12/1999 | Granata et al. |
| 6,011,597 A | * | 1/2000 | Kubo .......................... 348/725 |
| 6,052,554 A | | 4/2000 | Hendricks et al. |
| 6,067,107 A | | 5/2000 | Travaille et al. |
| 6,067,440 A | * | 5/2000 | Diefes ......................... 725/27 |
| 6,101,171 A | * | 8/2000 | Yoshida et al. ............. 370/280 |
| 6,160,988 A | * | 12/2000 | Shroyer ....................... 725/63 |

(Continued)

FOREIGN PATENT DOCUMENTS

EP             1030463 A2     8/2000

*Primary Examiner*—Andy Lee
(74) *Attorney, Agent, or Firm*—Georgann S. Grunebach

(57) ABSTRACT

A system for determining which of several satellites to tune an integrated receiver/decoder (IRD) to for receiving electronic program guide data is described. The system scans a plurality of multi-switch ports attempting to acquire a digital marker associated with a predetermined network identifier and polarity. The acquired marker contains information representing a satellite network and a satellite transponder number. In this manner, the system automatically configures the IRD to present electronic program guide information associated with available satellites while excluding guide information associated with unavailable satellites.

27 Claims, 5 Drawing Sheets

U.S. PATENT DOCUMENTS

| | | |
|---|---|---|
| 6,169,877 B1 * | 1/2001 | Gulla' ........................ 725/63 |
| 6,172,972 B1 * | 1/2001 | Birdwell et al. ............ 370/349 |
| 6,208,636 B1 | 3/2001 | Tawil et al. |
| 6,212,682 B1 | 4/2001 | Kuno |
| 6,263,506 B1 | 7/2001 | Ezaki et al. |
| 6,310,661 B1 | 10/2001 | Arsenault |
| 6,331,979 B1 * | 12/2001 | Dillon et al. ................ 370/392 |
| 6,363,525 B1 | 3/2002 | Dougherty et al. |
| 6,408,437 B1 | 6/2002 | Hendricks et al. |

* cited by examiner

METHOD AND APPARATUS FOR DETERMINING THE CONFIGURATION OF CONNECTIONS ASSOCIATED WITH A SATELLITE RECEIVER/DECODER

RELATED APPLICATIONS

This application is a continuing application claiming priority from U.S. application Ser. No. 09/130,492, filed Aug. 7, 1998, now U.S. Pat. No. 6,430,165 which is incorporated herein by reference.

TECHNICAL FIELD OF THE INVENTION

The present invention relates in general to a method and apparatus for determining the configuration of connections associated with a satellite receiver/decoder and in particular to determining which of several possible satellite resources are connected to each of several ports on a direct-to-home satellite television receiver/decoder.

BACKGROUND OF THE INVENTION

Television technology has come a long way. Television viewers have more choices today than ever before. Viewers have more services to choose from including, terrestrial, cable, and direct-to-home satellite services. Viewers have more channels to choose from, often exceeding a hundred channels from a single service. In addition, viewers have more equipment options to choose from, including TVs, set top boxes, and satellite dishes from multiple manufacturers.

With all this welcomed choice comes two significant problems. First, it is often difficult for the average consumer to connect the equipment together correctly. For example, connecting cables between more than one satellite dish and an integrated receiver decoder (IRD) can be very confusing. Instruction manuals, hardware keys, color coding, and other similar prior art solutions are inadequate. The equipment may not necessarily be from the same manufacturer, therefore standard connection configurations must be agreed upon by the various manufacturers a priori. Even when a single manufacturer is responsible for all the components, that manufacturer typically does not know which of several options the customer is pursuing (e.g., one satellite dish connected to this year's model of IRD, or two satellites dishes connected to last year's model of IRD and an adapter box, etc.). Consequently, authors of instruction manuals try to cover all the combinations. As a result, these instruction manuals are typically large and contain an excessive amount of irrelevant information.

The second problem the viewer faces is figuring out what programs are available for viewing. Many systems now provide the viewer with an on-screen program guide that can be navigated using a remote control. However, in a system where multiple signal sources are potentially available (e.g., more than one satellite dish connection), a large number of programs listed may not actually be available for viewing if all the potential connections are not actually made.

BRIEF DESCRIPTION OF THE DRAWINGS

These and other features and advantages of the present invention will be apparent to those of ordinary skill in the art in view of the detailed description of the preferred embodiment which is made with reference to the drawings, a brief description of which is provided below.

DETAILED DESCRIPTION OF THE PREFERRED EMBODIMENTS

Figure 1:
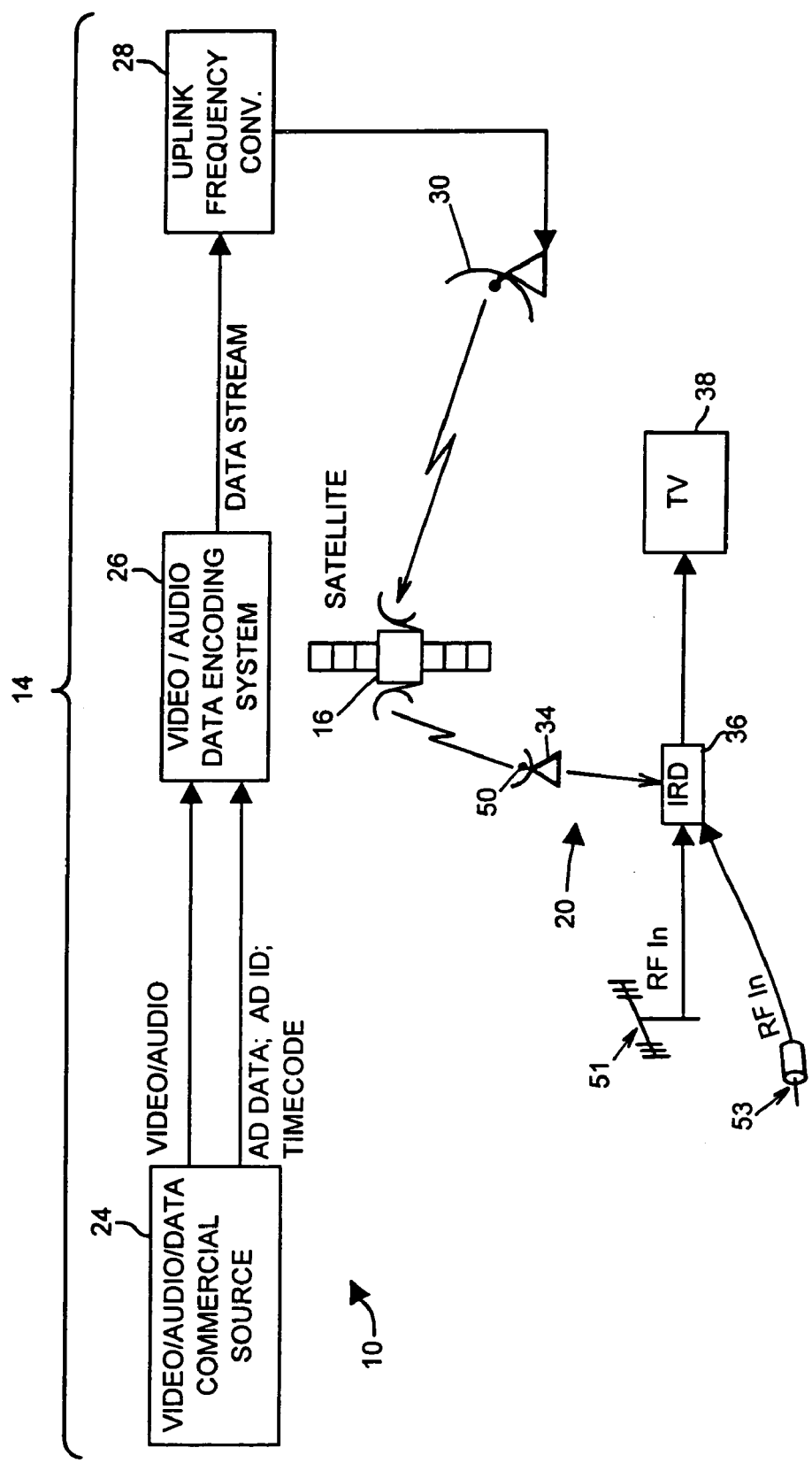
FIG. 1 is a high level block diagram of a direct broadcast satellite system.

The system described herein is directed to a direct-to-home integrated receiver/decoder (IRD) and a method for automatically determining the configuration of connections associated with the IRD. Using this system, content from an electronic program guide that is unavailable under the current configuration of the system may be excluded. Although the following description focuses on satellite broadcasts, persons of ordinary skill in the art will readily appreciate that the techniques of the present invention are in no way limited to satellite broadcasts. To the contrary, any multimedia system which might benefit from an automatic determination of how the system is configured in order to exclude certain content from an electronic program guide may employ the techniques shown herein.

In one aspect, the system described herein employs a method for determining an installation configuration associated with a direct-to-home satellite television receiver system. The receiver system typically includes a receiver, two or more communication ports, and a memory device. The method retrieves configuration data (e.g., a table showing which ports are receiving signals from which networks and polarities) and one or more frequencies (digitally represented) from the memory device. A determination is made if the configuration data already contains an association for the first communication port. If not, the receiver is tuned to the first frequency retrieved from memory, and the signal is monitored on the first communication port for a predetermined marker. If the predetermined marker is found within a predetermined period of time, an association between the first communication port and the digital representation of the network/polarity is stored in the memory device. The method then repeats for all remaining communication ports, networks, polarities, and/or frequencies.

In one embodiment, data may be excluded from an electronic program guide that is associated with unavailable content (e.g., content normally received from a network/polarity that was not found on any of the ports). In some embodiments, a default configuration table may be stored in the memory device if the predetermined marker is not found on one or more communications ports within the predetermined period of time.

In general, television signal distribution systems rely on either a cable network or a free-space propagation system for delivering television signals to individual users or subscribers. Cable-based television systems transmit individual television signals or "channels" over a wire. Free-space propagation systems transmit a plurality of channels over-the-air, i.e., in a wireless manner. Most large-scale cable and wireless television signal distribution systems broadcast a broadband television signal having a plurality of individual television signals or channels modulated onto one or more carrier frequencies within a discernable frequency band.

Some wireless television signal distribution systems use one or more geosynchronous satellites to broadcast the broadband television signal to receiver units within a large geographic area. Other wireless systems are land-based and use one or more transmitters located within smaller geographic areas to broadcast to individual receiver units within those geographic areas.

Typically, such wireless systems include a receiver for receiving and processing transmitted waveforms. One type of receiver is part of a wireless digital television system utilized by the DIRECTV® broadcast service. The DIRECTV® system allows residential consumers to receive over 175 television channels from a geosynchronous satellite.

The receiver includes a small (e.g., 18-inch) satellite antenna (e.g., reflective dish and low noise block) connected by a cable to an integrated receiver/decoder unit (IRD). The satellite antenna is aimed toward the satellites, and the IRD is connected to the user's television in a fashion similar to a conventional cable-TV decoder.

On the transmission side, video, audio, and related information data signals are digitally encoded into a packetized data stream using a number of algorithms, including convolutional error correction. The encoded data stream is then compressed to reduce bandwidth requirements, modulated to Ku-band frequency, transmitted to the satellite, and relayed from the satellite to the satellite antenna. The low noise block (LNB) of the satellite antenna shifts the Ku-band signal down to an L-band signal which is transmitted through the cable to the IRD.

In the IRD, front-end circuitry receives the L-band signal and converts it to the original digital data stream of video, audio, and related information signals. The digital data stream is fed to video/audio decoder circuits which perform the main video/audio processing functions such as demultiplexing and decompression. A microcontroller controls the overall operation of the IRD, including the selection of parameters, the set-up and control of components, channel selection, viewer access to different programming packages, blocking certain channels, and many other functions. The compression and decompression of packetized video and audio signals may be accomplished according to the Motion Picture Expert Group (MPEG) standards for performing digital video/audio compression. Thus, the IRD unit typically includes an MPEG-1 and/or MPEG-2 video/audio decoder in order to decompress the received compressed video/audio.

FIG. 1 is a block diagram of one such transmission and reception system 10. The illustrated system 10 includes a transmission station 14, a relay 16, and a plurality of receiver stations, one of which is shown at reference numeral 20. A wireless link provides the communications medium between the transmission station 14, the relay 16, and the receiver station 20. The transmission station 14 includes a programming/data source 24, a video/audio/data encoding system 26, an uplink frequency converter 28, and an uplink satellite antenna 30. The relay 16 is preferably at least one geosynchronous satellite. The receiver station 20 includes a satellite reception antenna 34 which may comprise a low-noise-block (LNB) 50, a receiver unit (or IRD) 36 connected to the LNB 50, and a television monitor 38 (or other output device) connected to the receiver unit 36.

In operation, the transmission station 14 can receive video and audio programming from a number of sources, including satellites, terrestrial fiber optics, cable, and/or audio/video tape. Preferably, the received programming signals, along with data signals such as electronic scheduling data and conditional access data, are sent to the video/audio/data encoding system 26 where they are digitally encoded and multiplexed into a packetized data stream using a number of conventional algorithms, including convolutional error correction and compression. In a conventional manner, the encoded data stream is modulated and sent through the uplink frequency converter 28 which converts the modulated encoded data stream to a frequency band suitable for reception by the satellite 16. Preferably, the satellite frequency is Ku-band. The modulated, encoded data stream is then routed from the uplink frequency converter 28 to an uplink satellite antenna 30 where it is broadcast toward the satellite 16 over the airlink. The satellite 16 receives the modulated, encoded Ku-band data stream and re-broadcasts it downward toward an area on earth that includes the various receiver stations 20. The LNB 50 of the satellite antenna 34 of the receiver station 20 shifts the Ku-band signal down to an L-band signal which is transmitted to the receiver unit 36.

Figure 2:
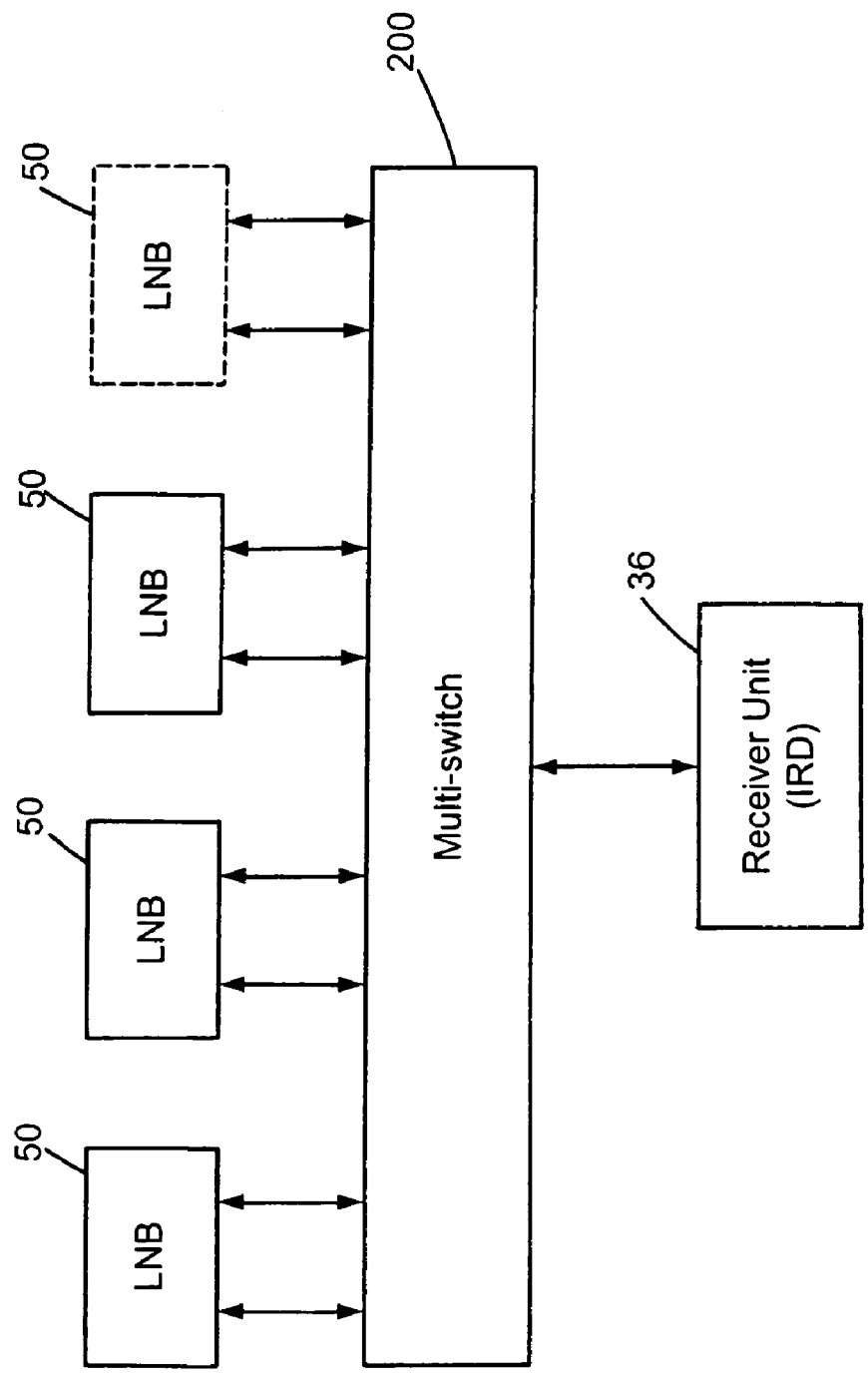
FIG. 2 is a block diagram illustrating an exemplary configuration of satellite resources connected to the receiver station of FIG. 1 using a multi-switch device.

A block diagram illustrating an exemplary configuration of LNBs 50 connected to the receiver unit 36 using a multi-switch device 200 is illustrated in FIG. 2. Although this example uses a multi-switch 200 to connect the receiver unit 36 to one or more LNBs 50, persons of ordinary skill in the art will readily appreciate that the receiver unit 36 may be connected to LNBs 50 or other satellite resources with or without the use of a multi-switch 200. Further, the LNBs 50 may be stacked or non-stacked as is well known. Still further, the LNBs 50 may use a polarity switching scheme or both polarities simultaneously in a well known manner.

In this example, the receiver unit 36 selects one of eight input ports associates with one of four LNBs 50 via the multi-switch 200 by outputting a control signal to the multi-switch 200. The multi-switch 200 in turn provides a control signal to the LNB 50. The right hand or the left hand outputs may be selected at each LNB 50. In the preferred embodiment, the control signals consist of (i) +13V, (ii) +18V, (iii) +13V and 22 kHz, and (iv) +18V and 22 kHz. Of course, a person of ordinary skill in the art will readily appreciate that any number and any type of control signals may be used. For example, DiSEqC addressing commands may be sent to the multi-switch 200 to select a particular LNB 50. Using the method described below, the LNBs 50 may be connected to the multi-switch 200 indiscriminately, thereby easing the installation process.

Figure 3:
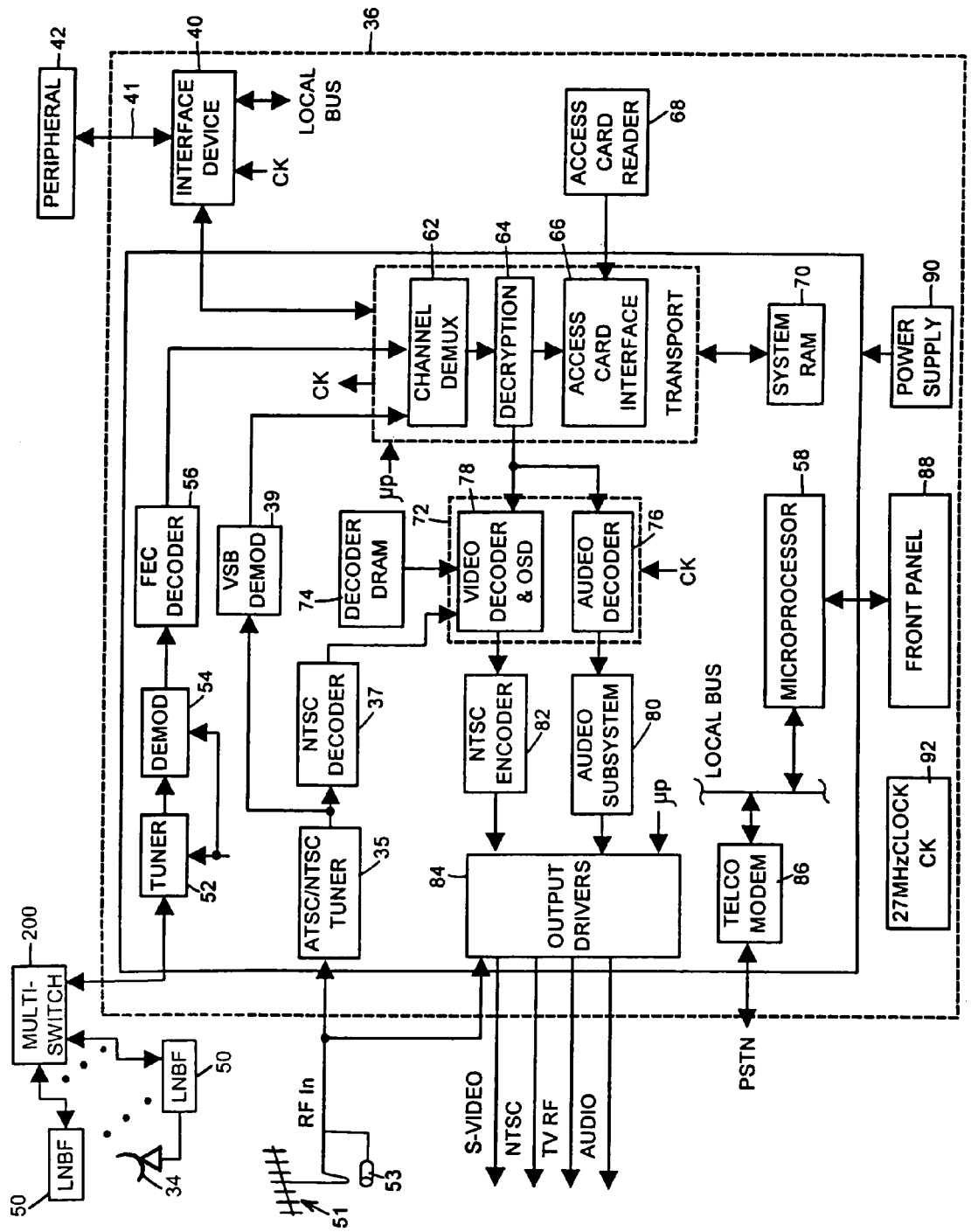
FIG. 3 is a block diagram illustrating more details of the receiver station of FIG. 1.

FIG. 3 is a more detailed block diagram of a portion of the receiver unit 36 shown in FIG. 1. In general, front-end circuitry inside the receiver unit 36 receives the L-band RF signals from the LNB 50 and converts them back into the original digital data stream. Decoding circuitry, receives the original data stream and performs video/audio processing operations such as demultiplexing and decompression. A microcontroller 58 controls the overall operation of the receiver unit 36, including the selection of parameters, the set-up and control of components, channel selection, and many other functions.

Specifically, the receiver unit 36 includes a tuner 52, demodulator 54, FEC decoder 56, the microcontroller 58, a transport circuit 60, a channel demultiplexer 62, decryption circuit 64, an access card interface 66, an access card reader 68, a memory device 70, an audio/video decoder circuit 72 having a random-access-memory (RAM) 74, audio decoder 76, video decoder 78, an audio digital-to-analog circuit 80, an NTSC (or other) encoder 82, output drivers 84, a modem connection 86, a front panel user interface 88, and a power supply 90, coupled together as illustrated. A 27 MHZ clock signal generator 92 is also provided. The clock generator 92 generates a clock signal (CK) which is coupled to the audio/video decoder circuit 72 and which is frequency-calibrated by a signal received from the transport circuit 60, as shown.

The transport 60 receives the transport stream of digitized data packets containing video, audio, data, scheduling information, and other data. The digital packet information contains identifying headers as part of its overhead data. Under control of the micro-controller 58, the channel demultiplexer 62 filters out packets that are not currently of interest, and routes the data packets that are of interest through the decryption circuit 64 and, in the case of some packets, also through the access control circuits 66, 68 to their proper downstream destination. The decryption circuit 64 provides decryption for the data packets that have been encrypted. The access control circuits 66, 68 provide access control by any conventional means. For example, access control may be achieved by requiring a data packet to have a proper authorization code in order to be passed to the decryptor 64 and/or video decoder 78. The access card reader 68 can interface with an access card (not shown) that receives the packet authorization code, determines its validity, and generates a code that confirms to the transport 60 that the subject data packet is authorized.

The authorized data of interest, which now consists of the payload portions of the received data packets, are forwarded to decoder DRAM 74 for buffering and may optionally be intermediately stored in the memory device 70. The audio/video decoder 72 decodes the payloads stored in DRAM 74, as needed. The requested data is routed from the memory device 70 through the transport 60 to the audio/video decoder 72. At that time, the data is routed to the video decoder 78 (which includes display generating circuitry) and the NTSC (or other) encoder 64. Preferably, the video decoder 78 reads in the compressed video data from the DRAM 74, parses it, creates quantized frequency domain coefficients, then performs an inverse quantization, inverse discrete cosine transform (DCT) and motion compensation. At this point, an image is reconstructed in the spatial domain. This image is then stored in a frame buffer in the DRAM 74. At a later time, the image is read out of the frame buffer in DRAM 74 and passed through the display circuitry to the encoder 82. The display circuitry (located in the video decoder 78) generates graphics for on-screen displays such as an electronic program guide. The encoder 78 converts the digital video signals to an analog signal according to the NTSC standard or to another desired output protocol (e.g., ATSC), thereby allowing video to be received by a conventional television 38 or other video output device.

In order to aide the user in navigating the content available on such a system, an on-screen television program guide may be generated. Preferably, content records are transmitted to describe the available content and allow the local receiver unit (IRD) 36 to build the program guide. In the preferred embodiment, the program guide excludes content that is unavailable under the current configuration of the system. For example, if certain networks are unavailable or certain connections are not made to the multi-switch 200, channels associated with the unavailable signals are preferably excluded from the program guide to reduce frustration to the user. Accordingly, the system must determine what network signals are available.

Figure 4A:
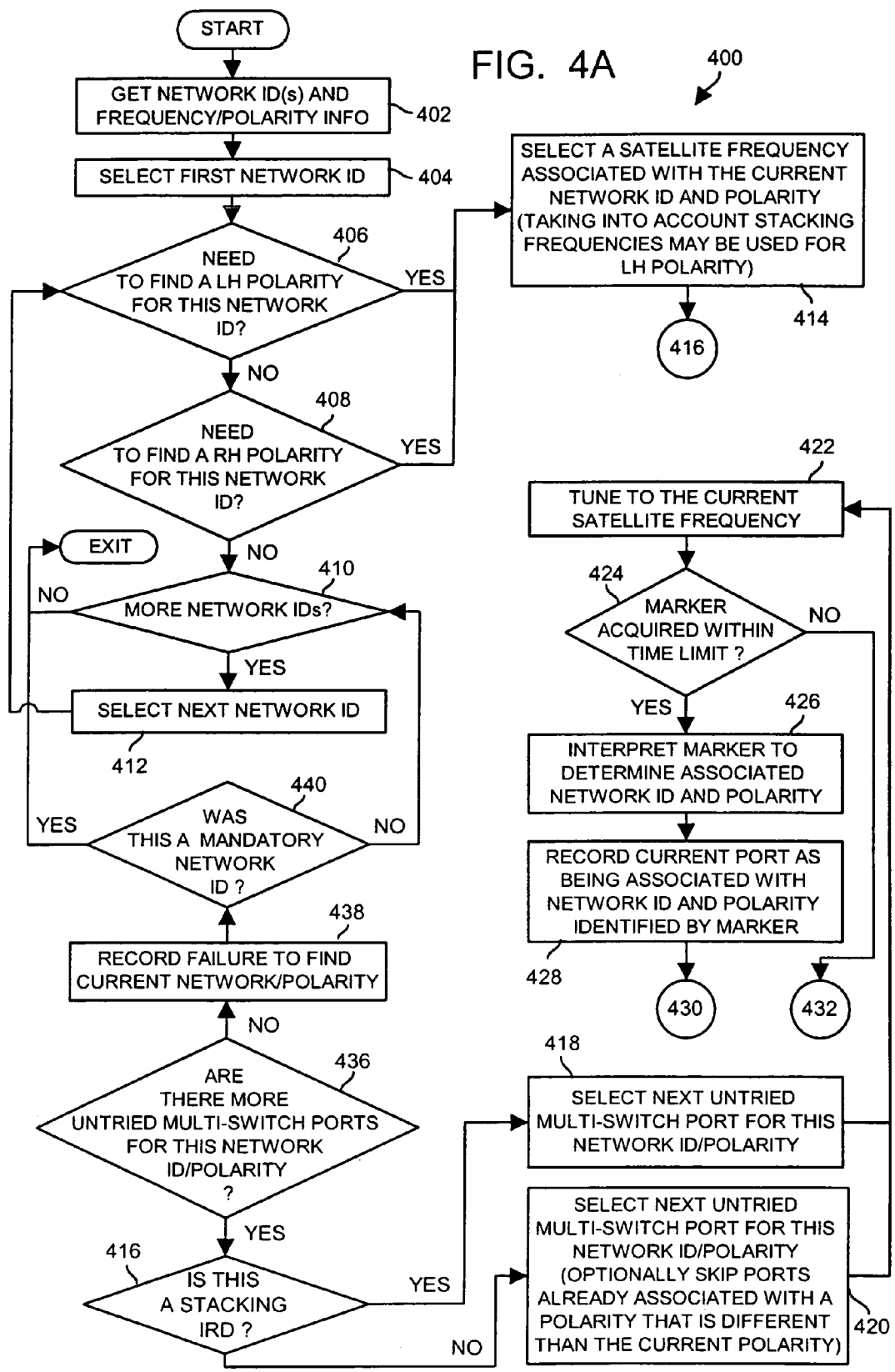
FIG. 4 is a flowchart of a program that can be implemented by the receiver station of FIG. 3 to determine what program guide content is unavailable due to a missing connection.
Figure 4B:
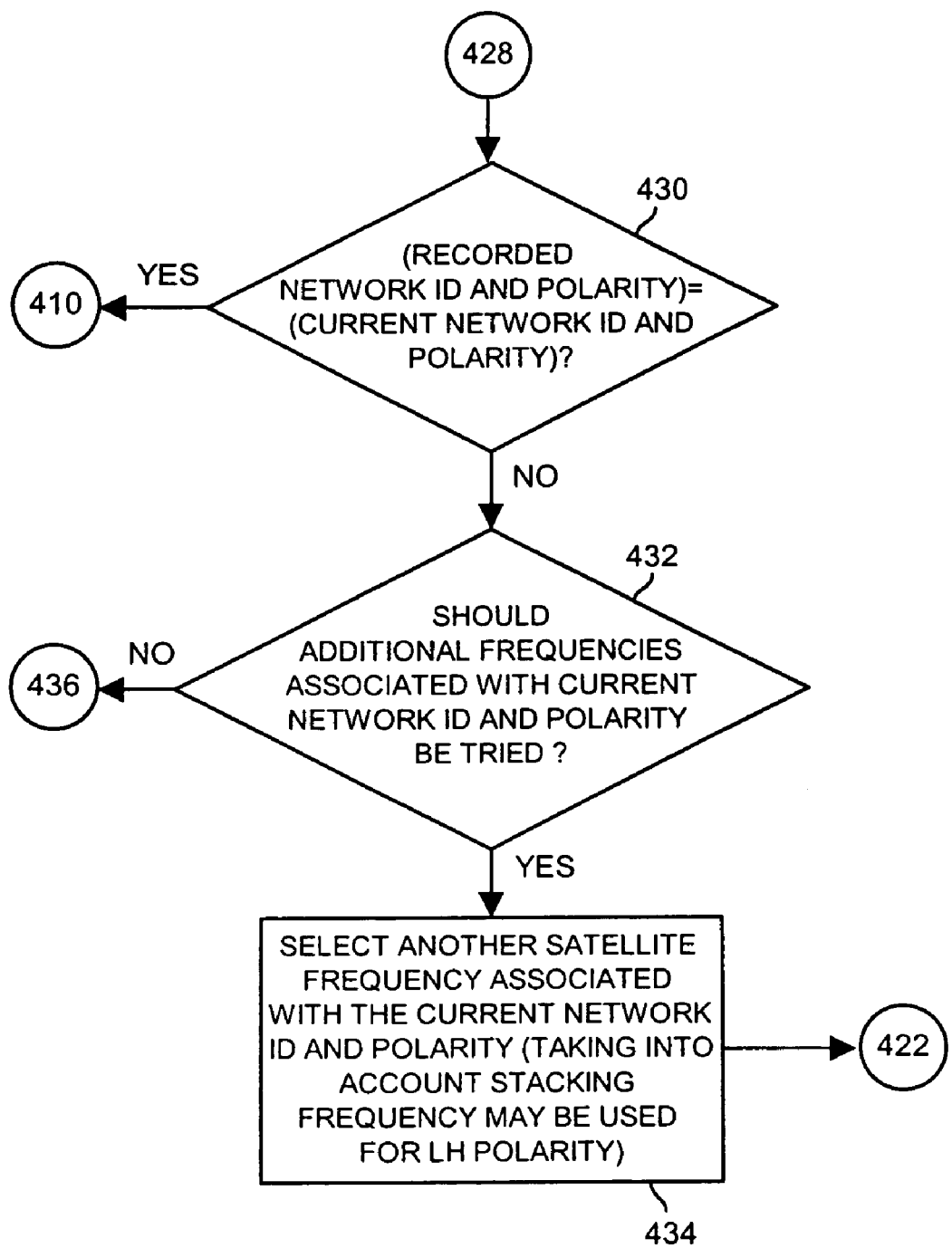

A flowchart of a program 400 that can be implemented by the IRD 36 is illustrated in FIG. 4. The program 400 may be used to determine which networks and polarities are available to the IRD 36 and on which port of the multi-switch 200 each network/polarity is available. Preferably, these steps are performed by the controller 58. In general, the program 400 scans each possible multi-switch port looking for a predefined marker pattern on a well known SCID (e.g., 0x810) on a particular satellite frequency and polarity associated with a particular network identifier. Marker patterns preferably include information associated with network identification (e.g., 0–255), frequency identification (e.g., 0–31), and polarity type (e.g., left-hand, right-hand, vertical, or horizontal). If the marker pattern is found, the program 400 associates the current multi-switch port with the particular network identifier and polarity and stores the association in the memory device 70. Multi-switch ports associated with identified polarities may be eliminated from the scanning loop in some cases as described in detail below.

The program 400 begins by receiving and/or retrieving a plurality of network identifiers, each of which is associated with one or more direct-to-home satellite transmission frequencies and one or more polarities such as a left-hand polarity and/or a right-hand polarity (step 402). Some or all of the information obtained at step 402 may be received from a wireless transmission such as a satellite transmission, and/or from a wire-line transmission such as a telephone line transmission. In addition, some or all of the information obtained at step 402 may be retrieved from a memory device such as internal RAM, internal ROM, and/or a removable memory card. Subsequently, one of the network identifiers from the plurality of network identifiers is selected (step 404). Preferably, a mandatory network identifier and/or the network identifier with the lowest number (e.g., 0) is selected first. Mandatory network identifiers are network identifiers associated with signals that must be acquired for the receiver system 36 to operate properly. If a mandatory network cannot be located, the entire program 400 is preferably aborted as described in detail below.

Once a network identifier is selected from the plurality of network identifiers, the information obtained at step 402 is consulted to determine if the program 400 needs to find a left-hand polarity for the selected network identifier (step 406). For example, a look-up table may be employed. If the program 400 determines that it does not need to find a left-hand polarity for the selected network identifier, the program 400 consults the information obtained at step 402 to determine if it needs to find a right-hand polarity for the selected network identifier (step 408). Of course, a person of ordinary skill in the art will readily appreciate that other polarities may also be used within the scope and spirit of the present invention.

If the program 400 determines that it needs to find a particular polarity for the selected network identifier at step 406 or step 408, the program 400 selects a satellite frequency associated with the current network identifier/polarity from the satellite frequencies obtained in step 402 (step 414). In some instances, the program 400 may need to take into account that a stacking frequency may be used for a left-hand polarity.

Subsequently, the program 400 determines if the IRD 36 being used is a stacking IRD in a well known manner (step 416). If the IRD 36 is a stacking IRD, the program 400 selects the next untried multi-switch port for the current network identifier/polarity (step 418). For example, if the program 400 just started looking for the left-hand polarity of network zero, the program 400 may select the first multi-switch port. If the program 400 has already looked for the left-hand polarity of network zero on the first multi-switch port, the program 400 may select the second multi-switch port, and so on.

On the other hand, if the IRD 36 is a non-stacking IRD, the program 400 selects the next untried multi-switch port for the current network identifier/polarity and optionally skips multi-switch ports already associated with a polarity that is different than the current polarity, even if the skipped multi-switch port has not been tried with the current network identifier and polarity (step 420). For example, if the program 400 just started looking for the left-hand polarity of network zero, the program 400 may select the first multi-switch port (same as the stacking case so far). However, if the program 400 has already looked for the left-hand polarity of network zero on the first multi-switch port, and the second multi-switch port is already associated with any right-hand polarity, but the third multi-switch port is not associated with a right-hand polarity, the program 400 may skip the second multi-switch port and select the third multi-switch port.

Once a multi-switch port is selected, the program 400 causes the IRD 36 to tune to the currently selected satellite frequency in a well known manner (step 422). Subsequently, for a predetermined period of time, the program 400 decodes data received via the tuned signal looking of for a predetermined marker pattern (step 424). If the marker pattern is received, the program may interpret the included data to determine the network identifier and polarity associated with the marker pattern (step 426). The program 400 then records the fact that the currently selected multi-switch port is associated with the received network identifier and the received polarity which are included with the received marker pattern (step 428).

However, the received network identifier and the received polarity may not be the network identifier and polarity program 400 is currently seeking. Therefore, the program 400 compares the recorded network identifier and polarity to the current network identifier and polarity (step 430). If the recorded network identifier and polarity are the same as the current network identifier and polarity, the program 400 moves on by checking if there are more network identifiers to find (step 410). If the recorded network identifier and polarity are not the same as the current network identifier and polarity, the program 400 keeps looking for the current network identifier and polarity. However, the recorded network identifier and polarity remain recorded so that they are skipped on subsequent iterations of the program 400.

In some instances, trying one satellite frequency associated with a particular network identifier and polarity is sufficient to determine if that network identifier and polarity are present on the current multi-switch port. In other instances, more than one satellite frequency should be tuned when searching for a particular network identifier and polarity. Preferably, this distinction is included in the data received at step 402. Accordingly, the program checks if additional frequencies associated with the current network identifier and polarity should be tuned (step 432). If an additional frequency associated with the current network identifier and polarity should be tuned, the program 400 selects another satellite frequency associated with the current network identifier and polarity from the satellite frequencies obtained in step 402 (step 434) and loops back to step 422.

If additional frequencies associated with the current network identifier and polarity should not be tuned, the program 400 determines if there are more untried multi-switch ports for this network identifier and polarity (step 436). This is preferably accomplished by scanning the multi-switch ports in a predetermined sequence and checking if the last one in the sequence has been checked. If there are more untried multi-switch ports for this network identifier and polarity, the program 400 preferably selects an untried multi-switch port, taking into account that the IRD 36 may be a stacking IRD as described in detail above. If there are no more untried multi-switch ports for this network identifier and polarity, the program 400 preferably records a message in memory indicative of a failure to find the current network identifier and polarity on any multi-switch port (step 438).

In the event of such a failure, the program 400 checks the data received in step 402 to see if the current network identifier is designated as a mandatory network identifier. Mandatory network identifiers are network identifiers associated with signals that must be acquired for the satellite receiver 36 to operate properly (e.g., network zero). If the current network identifier is not designated as mandatory, the program 400 preferably moves on by checking if there are more network identifiers to find (step 410). If there are no more network identifiers to find, or the current network identifier is designated as mandatory and could not be found, then the program 400 preferably exits.

In summary, persons of ordinary skill in the art will readily appreciate that a method and apparatus for determining network availability and configuration at a satellite receiver/decoder has been provided. Users of satellite systems implementing the teachings of the present invention will be less burdened with the need to consult user's manuals in an attempt to install the system in a particular configuration. Further, these users will benefit from an electronic program guide which eliminates data associated with programs which are unavailable thereby conserving memory and simplifying the program guide.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. A method of selecting a particular multi-switch port from a plurality of multi-switch ports for association with a current network identifier and a current polarity designator in a direct-to-home satellite receiver system, the method comprising:

receiving the current network identifier, the current polarity designator, and a satellite frequency, the satellite frequency being associated with the current network identifier and the current polarity designator;

tuning the direct-to-home satellite receiver system to the satellite frequency;

placing a first multi-switch port from the plurality of multi-switch ports into a selected state by generating a first control signal indicative of the first multi-switch port;

determining if a first predetermined marker pattern is acquired within a first predetermined time period while the first multi-switch port is in the selected state;

placing a second multi-switch port from the plurality of multi-switch ports into a selected state by generating a second control signal indicative of the second multi-switch port;

determining if a second predetermined marker pattern is acquired within a second predetermined time period while the second multi-switch port is in the selected state;

associating first data indicative of the second multi-switch port with second data indicative of the current network identifier and the current polarity designator; and recording the first data and the second data in a memory device if the second predetermined marker pattern is acquired within the second predetermined time period.

2. A method as defined in claim 1, wherein the first predetermined marker pattern comprises the second predetermined marker pattern and the first predetermined time period comprises the second predetermined time period.

3. A method as defined in claim 1, further comprising:
determining if the direct-to-home satellite receiver system comprises a stacking direct-to-home satellite receiver system; and
skipping a multi-switch part if the direct-to-home satellite receiver system does not comprise a stacking direct-to-home satellite receiver system.

4. A method as defined in claim 1, further comprising:
acquiring the second predetermined marker pattern; interpreting the second predetermined marker pattern to determine a received network identifier and a received polarity designator; comparing the received network identifier to the current network identifier; and
comparing the received polarity designator to the current polarity designator.

5. A method as defined in claim 1, wherein receiving the current network identifier, the current polarity designator, and a satellite frequency comprises receiving the current network identifier, the current polarity designator, and the satellite frequency via a satellite signal.

6. A method as defined in claim 1, wherein receiving the current network identifier, the current polarity designator, and a satellite frequency comprises receiving the current network identifier, the current polarity designator, and the satellite frequency via a telephone signal.

7. A method as defined in claim 1, wherein receiving the current network identifier, the current polarity designator, and a satellite frequency comprises receiving the current network identifier, the current polarity designator, and the satellite frequency from the memory device.

8. A method as defined in claim 1, wherein receiving the current network identifier, the current polarity designator, and a satellite frequency comprises receiving the current network identifier, the current polarity designator, and the satellite frequency from a removable memory device.

9. A method as defined in claim 1, wherein receiving the current network identifier, the current polarity designator, and a satellite frequency comprises receiving a right-hand polarity designator.

10. A method as defined in claim 1, wherein receiving the current network identifier, the current polarity designator, and a satellite frequency comprises receiving a left-hand polarity designator.

11. A method as defined in claim 1, wherein receiving the current network identifier, the current polarity designator, and a satellite frequency comprises receiving a stacking frequency associated with a left hand polarity.

12. A method as defined in claim 1, wherein receiving the current network identifier, the current polarity designator, and a satellite frequency comprises receiving a plurality of network identifiers.

13. A method as defined in claim 1, wherein receiving the current network identifier, the current polarity designator, and a satellite frequency comprises receiving a mandatory network identifier.

14. A method of determining a control signal configuration associated with a direct-to-home satellite television receiver system, the receiver system including a receiver, a first communication port, a second communication port, and a memory device, the method comprising:

retrieving configuration data from the memory device;
retrieving a digital representation of a first frequency from the memory device;
tuning the receiver to the first frequency;
determining if the configuration data contains an association between the first communication port and the digital representation of the first frequency;
monitoring the first frequency on the first communication port for a predetermined digital marker if the configuration data does not contain an association between the first communication port and the digital representation of the first frequency;
storing an association between the first communication port and the digital representation of the first frequency in the memory device if the predetermined marker is found using the first frequency on the first communication port within a predetermined period of time;
determining if the configuration data contains an association between the second communication port and the digital representation of the first frequency if the predetermined marker is not found using the first frequency on the first communication port within the predetermined period of time;
monitoring the first frequency on the second communication port for the predetermined digital marker if the configuration data does not contain an association between the second communication port and the digital representation of the first frequency; and
storing an association between the second communication port and the digital representation of the first frequency in the memory device if the predetermined marker is found using the first frequency on the second communication port within the predetermined period of time.

15. A method as defined in claim 14, further comprising the steps of;
retrieving a digital representation of a second frequency from the memory device;
tuning the receiver to the second frequency;
determining if the configuration data contains an association between the first communication port and the digital representation of the second frequency;
monitoring the second frequency on the first communication port for the predetermined digital marker if the configuration data does not contain an association between the first communication port and the digital representation of the first frequency and the configuration data does not contain an association between the first communication port and the digital representation of the second frequency;
storing an association between the first communication port and the digital representation of the second frequency in the memory device if the predetermined marker is found using the second frequency on the first communication port within a predetermined period of time;
determining if the configuration data contains an association between the second communication port and the digital representation of the second frequency if the predetermined marker is not found using the second frequency on the first communication port within the predetermined period of time;
monitoring the second frequency on the second communication port for the predetermined digital marker if the configuration data does not contain an association between the second communication port and the digital representation of the first frequency and the configuration data does not contain an association between the second communication port and the digital representation of the second frequency; and storing an association between the second communication port and the digital representation of the second frequency in the memory device if the predetermined marker is found using the second frequency on the second communication port within the predetermined period of time.

16. A method as defined in claim 14, further comprising excluding data from an electronic program guide that is associated with unavailable content.

17. A method as defined in claim 14, further comprising storing a default association in the memory device if the predetermined marker is not found using the first frequency on the first communication port within the predetermined period of time.

18. A method as defined in claim 14, wherein tuning the receiver to the first frequency comprises selecting a port of a multi-switch by outputting a predefined voltage to the multi-switch.

19. A method as defined in claim 18, wherein selecting a port of a multi-switch by outputting a predefined voltage to the multi-switch comprises outputting +13V to the multi-switch.

20. A method as defined in claim 18, wherein selecting a port of a multi-switch by outputting a predefined voltage to the multi-switch comprises outputting +18V to the multi-switch.

21. A method as defined in claim 18, wherein tuning the receiver to the first frequency comprises selecting the port of the multi-switch by outputting a predefined tone to the multi-switch.

22. A method as defined in claim 21, wherein selecting the port of the multi-switch by outputting a predefined tone to the multi-switch comprises outputting 22 kHz to the multi-switch.

23. A method as defined in claim 22, wherein the 22 kHz output is modulated with a predefined command protocol.

24. A method as defined in claim 14, wherein monitoring the first frequency on the first communication port for a predetermined digital marker comprises monitoring service channel number 0x810.

25. An apparatus for determining a control switch configuration associated with a direct-to-home satellite television system comprising:

a receiver for receiving direct-to-home satellite television signals on a first frequency;

a first communication port selectively coupled to the receiver for receiving direct-to-home satellite television signals from a first signal source;

a second communication port selectively coupled to the receiver for receiving direct-to-home satellite television signals from a second signal source;

a memory device for storing a digital representation of a first frequency and configuration data; and a controller operatively coupled to the receiver, the first communication port, the second communication port and the memory device, the controller retrieving the digital representation of the first frequency and the configuration data from the memory device, the controller causing the receiver to tune to the first frequency, the controller determining if the configuration data contains an association between the first communication port and the digital representation of the first frequency, the controller monitoring the first frequency on the first communication port for a predetermined digital marker, the controller causing the memory device to store an association between the first communication port and the digital representation of the first frequency if the predetermined digital marker is found using the first frequency on the first communication port within a predetermined period of time, the controller determining if the configuration data contains an association between the second communication port and the digital representation of the first frequency, the controller monitoring the first frequency on the second communication port for the predetermined digital marker, the controller causing the memory device to store an association between the second communication port and the digital representation of the first frequency if the predetermined digital marker is found using the first frequency on the second communication port within a predetermined period of time.

26. An apparatus as defined in claim 25, wherein the controller retrieves a digital representation of a second frequency from the memory device, the controller causes the receiver to tune to the second frequency, the controller determines if the configuration data contains an association between the first communication port and the digital representation of the second frequency, the controller monitors the second frequency on the first communication port for the predetermined digital marker, the controller causes the memory device to store an association between the first communication port and the digital representation of the second frequency if the predetermined digital marker is found using the second frequency on the first communication port within a predetermined period of time.

27. An apparatus as defined in claim 25, wherein the controller excludes data from an electronic program guide that is associated with unavailable content.

* * * * *